(12) United States Patent
Jones et al.

(10) Patent No.: US 12,529,311 B2
(45) Date of Patent: Jan. 20, 2026

(54) DOWNHOLE WATER CHEMISTRY SENSING UTILIZING POLYMER MATRIX CARTRIDGE

(71) Applicant: Halliburton Energy Services, Inc., Houston, TX (US)

(72) Inventors: Christopher Michael Jones, Houston, TX (US); Christian Reding, Houston, TX (US); James Martin Price, Cypress, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 372 days.

(21) Appl. No.: 18/223,288

(22) Filed: Jul. 18, 2023

(65) Prior Publication Data

US 2025/0027412 A1    Jan. 23, 2025

(51) Int. Cl.
| | | |
|---|---|---|
| *E21B 49/08* | (2006.01) | |
| *G01N 21/63* | (2006.01) | |
| *G01N 21/78* | (2006.01) | |
| *G01N 31/22* | (2006.01) | |
| G01N 21/03 | (2006.01) | |
| G01N 21/05 | (2006.01) | |

(Continued)

(52) U.S. Cl.
CPC ........ *E21B 49/0875* (2020.05); *E21B 49/088* (2013.01); *G01N 21/63* (2013.01); *G01N 21/78* (2013.01); *G01N 31/22* (2013.01); *G01N 2021/0389* (2013.01); *G01N 2021/052* (2013.01); *G01N 21/645* (2013.01); *G01N 21/65* (2013.01); *G01N 2021/7786* (2013.01)

(58) Field of Classification Search
CPC .............. E21B 49/0875; E21B 49/088; G01N 2021/0389; G01N 2021/052; G01N 2021/7786; G01N 21/63; G01N 21/645; G01N 21/65; G01N 21/78; G01N 31/22
See application file for complete search history.

(56) References Cited

U.S. PATENT DOCUMENTS

| | | | |
|---|---|---|---|
| 8,104,338 B2 * | 1/2012 | DiFoggio | E21B 49/10 |
| | | | 73/152.55 |
| 11,401,807 B2 | 8/2022 | Leblanc et al. | |

(Continued)

OTHER PUBLICATIONS

International Search Report & Written Opinion; PCT Application No. PCT/US2023/028101; mailed Apr. 8, 2024.

*Primary Examiner* — Mark R Gaworecki
(74) *Attorney, Agent, or Firm* — NOVAK DRUCE CARROLL LLP (57) ABSTRACT

Systems and methods are provided for determining ion concentration of a fluid downhole using a polymer matrix packaged in a cartridge. An example method can include disposing a cartridge within a flow path of a sensor. The cartridge includes a bracket; a retainer formed of a porous material having pores sized to allow a fluid to flow therethrough; and a substrate comprising a polymer matrix embedded with an ion-indicator, the substrate configured to interact with the fluid and to modify an optical characteristic of the substrate according to an ion concentration of the fluid. The method further includes illuminating the substrate; detecting a change in an optical characteristic of the substrate, the change indicative of the ion concentration of the fluid; and determining the ion concentration of the fluid.

20 Claims, 5 Drawing Sheets

(51) Int. Cl.
*G01N 21/64* (2006.01)
*G01N 21/65* (2006.01)
*G01N 21/77* (2006.01)

(56) References Cited

U.S. PATENT DOCUMENTS

| | | |
|---|---|---|
| 2006/0054501 A1 | 3/2006 | Jiang et al. |
| 2009/0014325 A1 | 1/2009 | Jones et al. |
| 2018/0306765 A1 | 10/2018 | Zielinski et al. |
| 2022/0082496 A1 | 3/2022 | Skinner et al. |
| 2023/0220772 A1 | 7/2023 | Mcdowell |
| 2024/0151637 A1* | 5/2024 | Naveena-Chandran ..................... G01N 21/31 |

* cited by examiner

DOWNHOLE WATER CHEMISTRY SENSING UTILIZING POLYMER MATRIX CARTRIDGE

TECHNICAL FIELD

The present technology relates generally to water chemistry and, more specifically, to a method and system for determining an ion concentration of a fluid downhole using a polymer matrix packaged in a cartridge.

BACKGROUND

In the field of oil and gas exploration and extraction, measurement of ion concentration in fluids may be performed via complex sampling techniques involving chemical reagents and time-consuming procedures. However, the potential for error and inaccuracies, and the low time resolution of traditional ion measurement techniques, can be impractical in many downhole situations where conditions may change rapidly under harsh environments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Disclosed are systems and methods for determining ion concentration of a fluid downhole using a polymer matrix packaged in a cartridge. Ion concentration herein refers to the presence and abundance of various ions (e.g., calcium, chloride, magnesium, sodium, potassium, lithium, iron, hydrogen, etc.) dissolved in water and are typically expressed in units such as milligrams per liter (mg/L), parts per million (ppm), or moles per liter (mol/L). In oil recovery drilling operations, there is a need to accurately measure the ion concentration of the water used. Currently, there is a lack of real-time and reliable methods to monitor and measure ion concentrations in water during drilling operations. This poses several challenges, including the inability to assess reservoir compatibility, optimize water treatment processes, ensure chemical compatibility, prevent scaling and corrosion, and meet environmental regulations effectively. Effective management of ion concentration in water contributes to efficient oil recovery, reduces operational risks, and promotes sustainable practices in the oil and gas industry.

The polymer matrix may be hydrogel, silicon, PVA or PVC and is embedded with an ion-indicator that is configured to modify an optical characteristic, such as color, of the polymer matrix according to an ion concentration of the fluid. Specifically, the ion-indicator can change an optical response, e.g. absorption, transmission, reflection and fluorescence, of the polymer matrix embedded with the ion-indicator at a specific wavelength, such as ultraviolet, visible, near infrared, and infrared. Examples of the ion indicators that may be embedded within the polymer matrix are described in U.S. Pat. No. 11,401,807, which is incorporated by reference herein. By packaging the polymer matrix into a removable cartridge, the polymer matrix may be inserted in an optical path of a water chemistry sensor thereby enabling monitoring and measuring of the ion concentration of the drilling fluid in real-time using the sensor. The cartridge is configured to make constant contact with drilling fluid during operation thereby providing an accurate indication of the ion concentration of the drilling fluid. In addition, the cartridge is configured to withstand the harsh downhole conditions, including high pressures, temperatures, and potential corrosive environments, without impeding fluid flow through a flow path of the sensor while also preventing artifacts, such as filtrate and/or oil, from interfering with the optical path of the sensor.

By packaging the ion-indicator doped polymer matrix into a cartridge that is configured to be used with a water chemistry sensor, the ion concentration of drilling fluid may be measured downhole thereby allowing for continuous monitoring of ion concentration parameters during drilling operations. The real-time data from these sensors helps operators make informed decisions, optimize drilling parameters, and ensure the integrity and efficiency of the drilling process thereby enabling optimal reservoir compatibility, water treatment processes, chemical performance, scaling and corrosion control, and environmental compliance. Ultimately, the disclosed systems and methods will enhance operational efficiency, reduce risks, and maximize oil recovery rates in a cost-effective and sustainable manner.

According to at least one example, a cartridge to detect ion concentration of a fluid is provided. The cartridge can include a bracket having a first opening; a retainer disposed within the first opening, the retainer formed of a porous material having pores sized to allow a fluid to flow therethrough, the retainer having a second opening; and a substrate disposed within the second opening, the substrate formed of a polymer matrix embedded with an ion-indicator, the substrate configured to interact with the fluid and to modify an optical characteristic of the substrate according to an ion concentration of the fluid.

In another example, a system for measuring ion concentration of a fluid downhole using a polymer matrix packaged in a cartridge is provided. The system can include an optical source configured to provide an illumination light through a first window and a cartridge disposed adjacent to the first window. The cartridge can include a bracket having a first opening; a retainer disposed within the first opening, the retainer formed of a porous material having pores sized to allow a fluid to flow therethrough, the retainer having a second opening; and a substrate disposed within the second opening, the substrate comprising a polymer matrix embedded with an ion-indicator, the substrate configured to interact with the fluid and to modify an optical characteristic of the substrate according to an ion concentration of the fluid. The system also includes a detector configured to receive a sample light passing through the substrate and a second window, the second window disposed between the cartridge and the detector. The illumination light from the optical source optically interacts with the substrate to generate the sample light, the sample light indicative of the ion concentration of the fluid. The system also includes a controller configured to measure the ion concentration of the fluid based on the sample light.

In another example, a method for determining ion concentration of a fluid downhole using a polymer matrix packaged in a cartridge is provided. The method includes disposing a cartridge within a flow path of a sensor. The cartridge includes a bracket having a first opening; a retainer disposed within the first opening, the retainer formed of a porous material having pores sized to allow a fluid to flow therethrough, the retainer having a second opening; and a substrate disposed within the second opening, the substrate comprising a polymer matrix embedded with an ion-indicator, the substrate configured to interact with the fluid and to modify an optical characteristic of the substrate according to an ion concentration of the fluid. The method further includes illuminating the substrate; detecting a change in an optical characteristic of the substrate, the change indicative of the ion concentration of the fluid; and determining the ion concentration of the fluid.

Figure 1A:
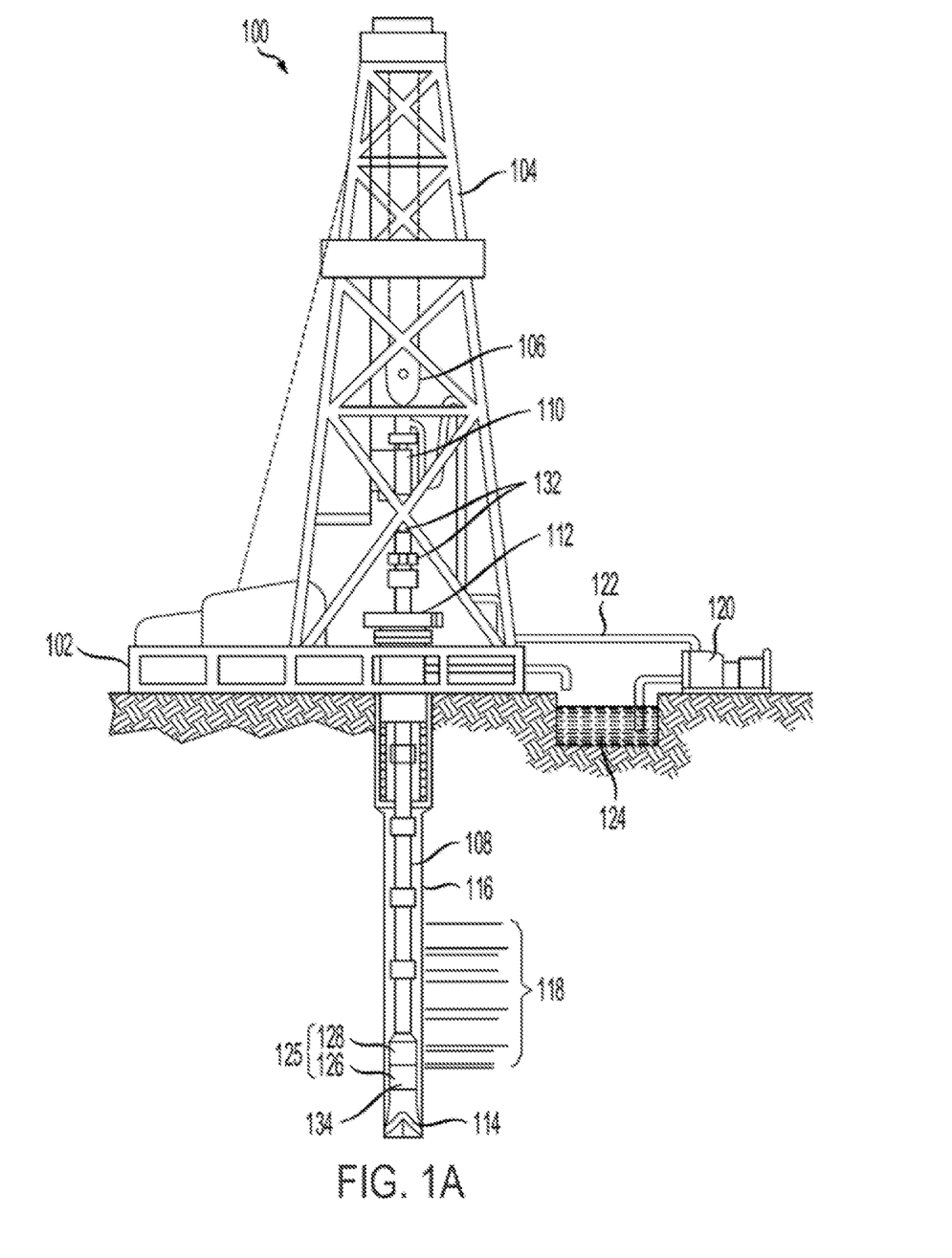
FIG. 1A is a schematic diagram of an example logging while drilling (LWD) wellbore operating environment, in accordance with some examples.
Figure 1B:
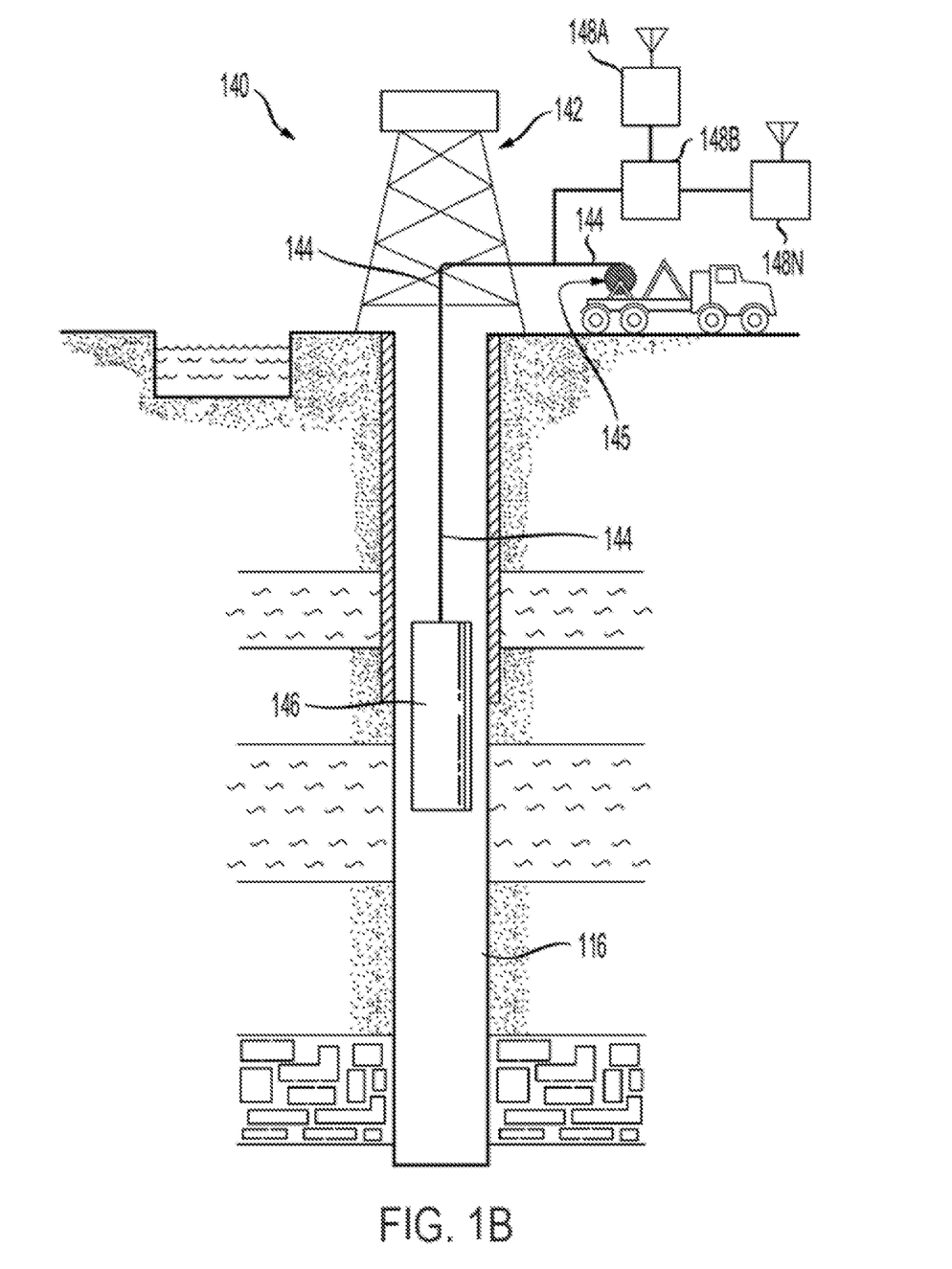
FIG. 1B is a schematic diagram of an example downhole environment having tubulars, in accordance with some examples.
Figure 2:
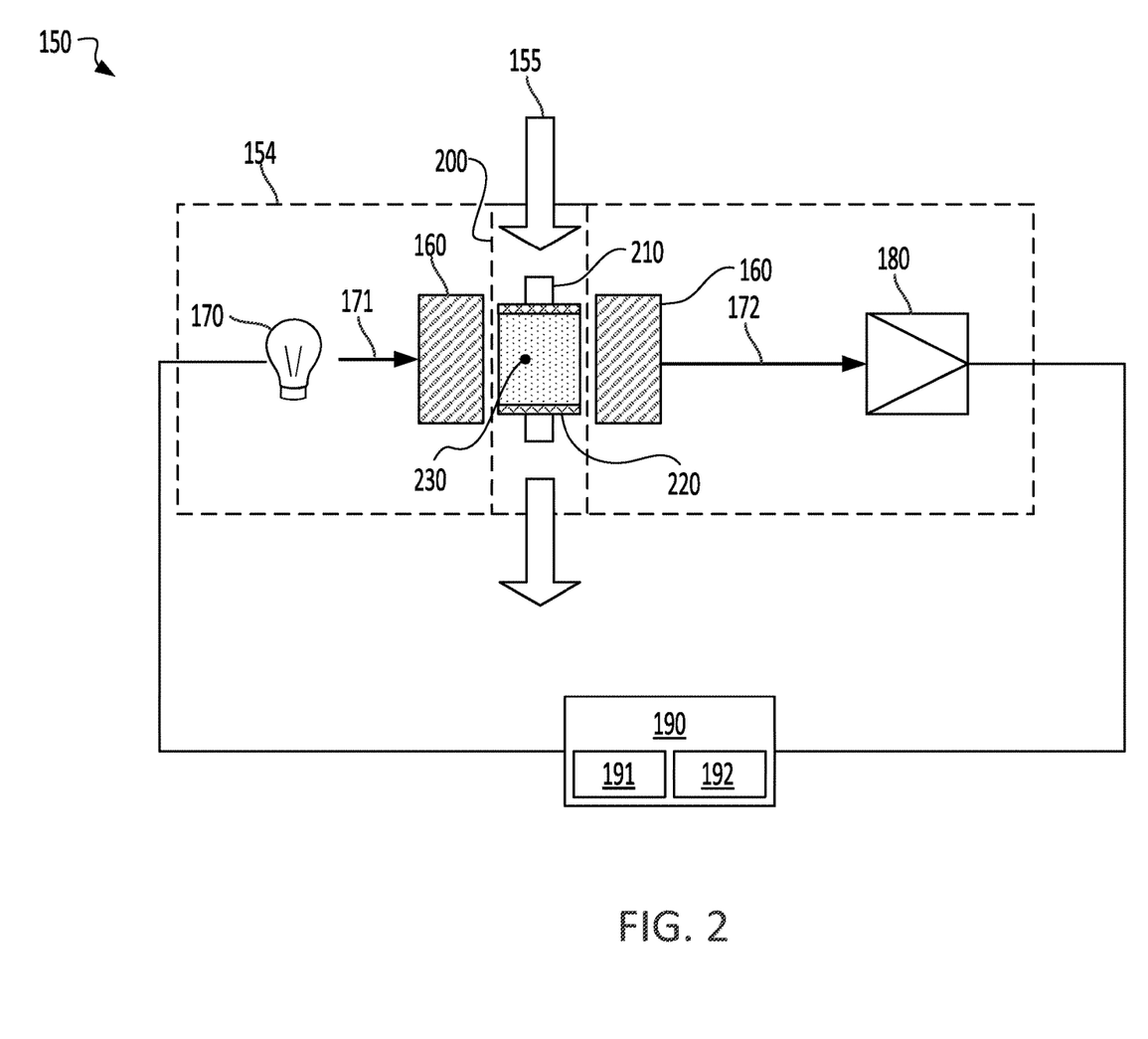
FIG. 2 is a block diagram of an example system for measuring ion concentration of a fluid downhole using a polymer matrix packaged in a cartridge, in accordance with some examples.
Figure 3:
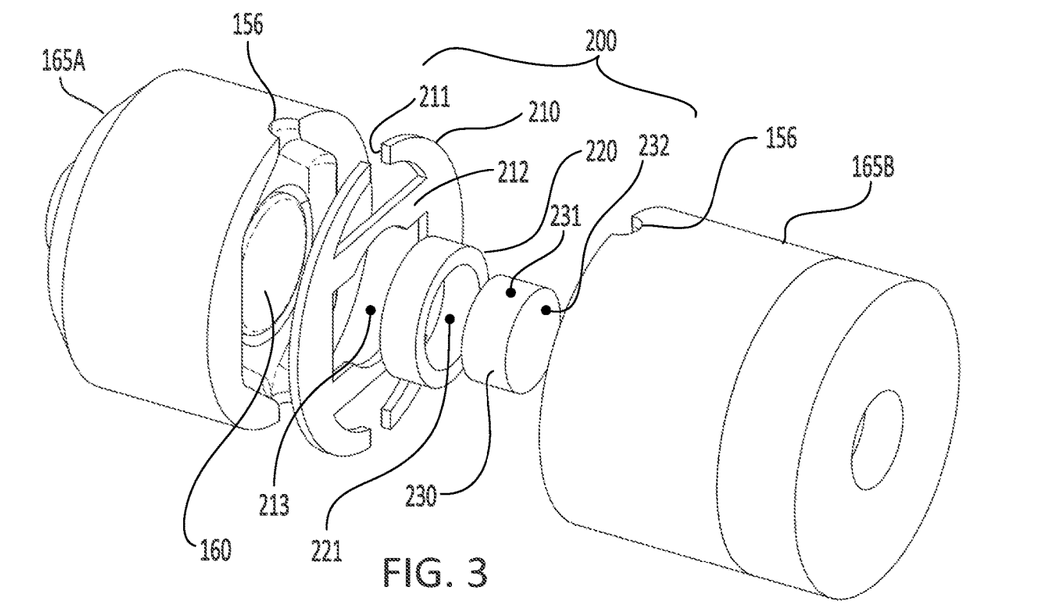
FIG. 3 is an exploded view of a polymer matrix packaged in a cartridge, in accordance with some examples.
Figure 4:
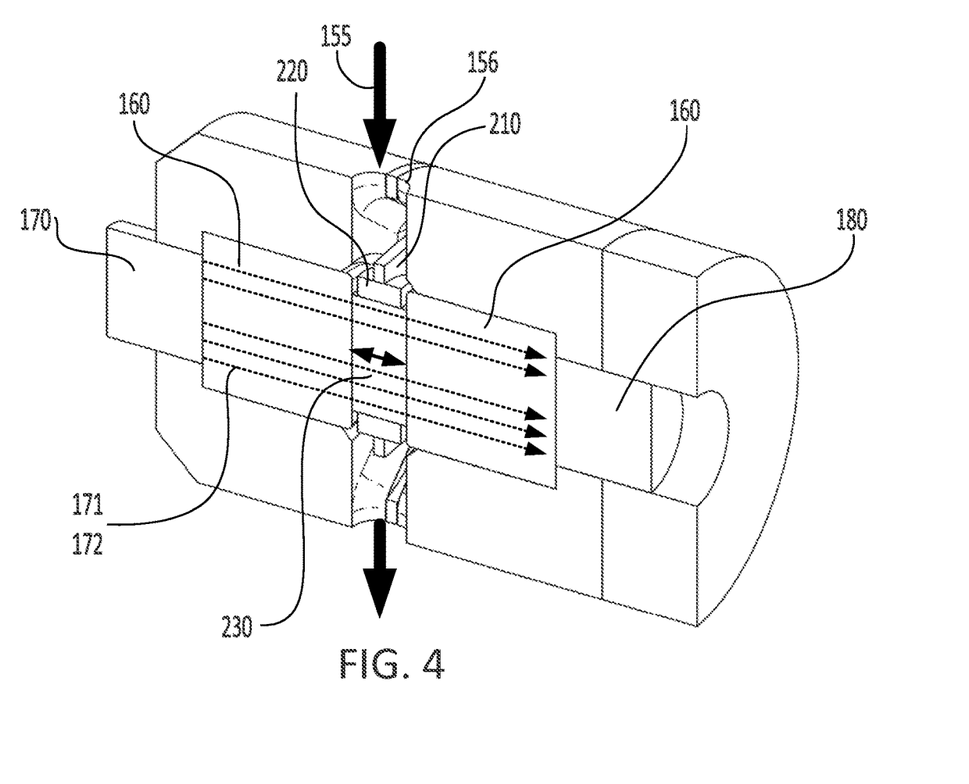
FIG. 4 is a cross-section view of a polymer matrix packaged in a cartridge, in accordance with some examples.
Figure 5:
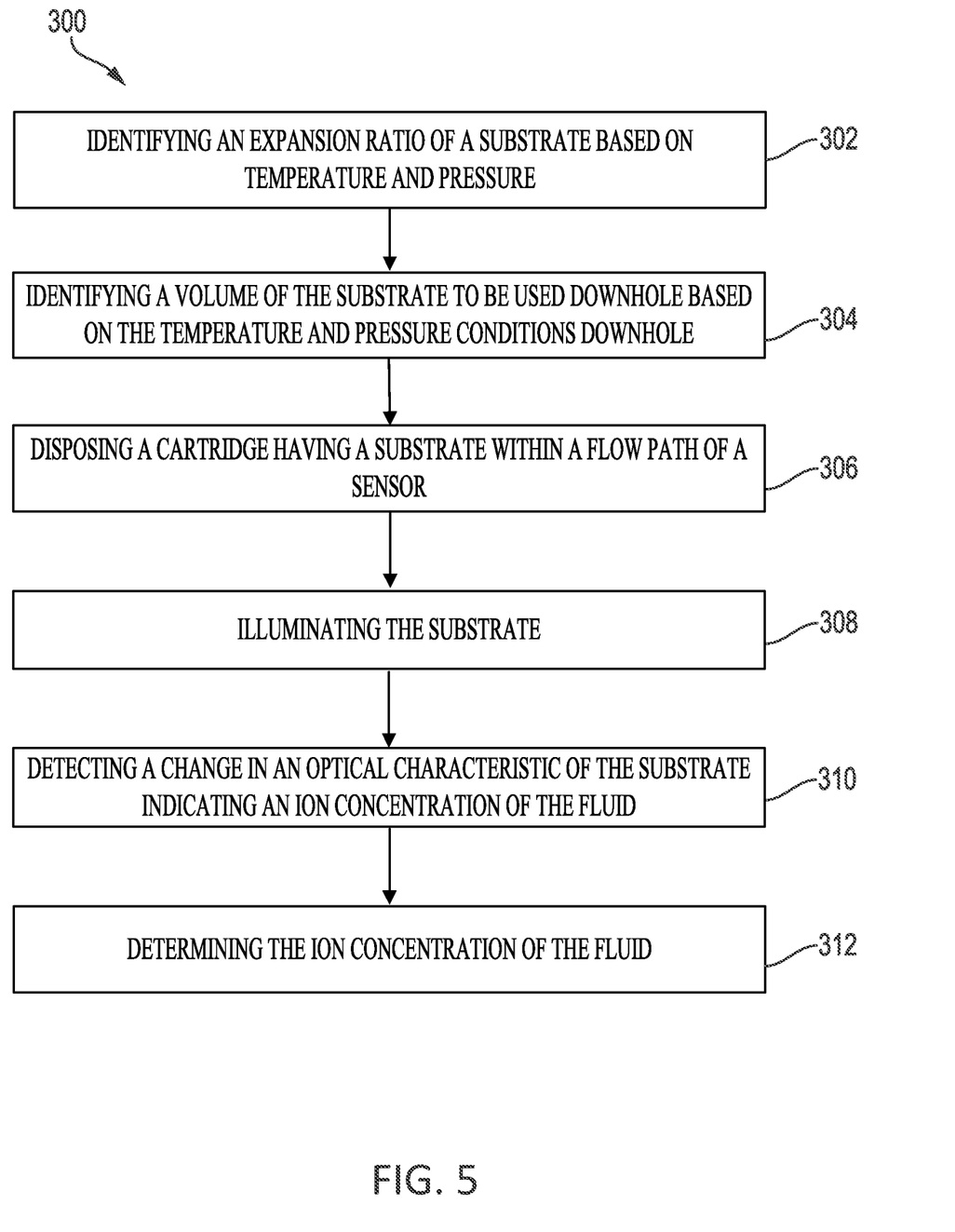
FIG. 5 is a flowchart of an example method for determining ion concentration of a fluid downhole using a polymer matrix packaged in a cartridge, in accordance with some examples.

As follows, the disclosure will provide a more detailed description of the systems, methods and techniques herein for measuring ion concentration of a fluid downhole using a polymer matrix packaged in a cartridge. The disclosure will begin with a description of example systems and environments, as shown in FIGS. 1A and 1B, and a discussion of a sensor utilizing a polymer matrix packaged in a removable cartridge, as shown in FIGS. 2 through 4. The disclosure concludes with a description of an example method for determining ion concentration of a fluid downhole using a polymer matrix packaged in a cartridge, as shown in FIG. 5, will then follow. These variations shall be described herein as the various embodiments are set forth.

The disclosure now turns to FIG. 1A, which illustrates a schematic view of a logging while drilling (LWD) wellbore operating environment 100 in in accordance with some examples of the present disclosure. As depicted in FIG. 1A, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various formations 118. A pump 120 circulates drilling fluid through a supply pipe 122 to top drive 110, down through the interior of drill string 108 and orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled with one or more wires and/or other media. The logging tools 126 may also include one or more computing devices 134 communicatively coupled with one or more of the one or more tool components by one or more wires and/or other media. The one or more computing devices 134 may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drillpipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drillpipe.

Referring to FIG. 1B, an example system 140 for downhole line detection in a downhole environment having tubulars can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a wireline conveyance 144 can be used. The tool body 146 can include a resistivity logging tool. The tool body 146 can be lowered into the wellbore 116 by wireline conveyance 144. The wireline conveyance 144 can be anchored in the drill rig 145 or a portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 provides support for the tool, as well as enabling communication between tool processors 148A-N on the surface and providing a power supply. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

FIG. 2 is a block diagram of an example system 150 for measuring ion concentration of a fluid downhole using a polymer matrix packaged in a cartridge, in accordance with some examples. The system 150 includes a cartridge 200 disposed within an optical path 171, 172 of a sensor 154. The sensor 154 may be an optical sensor, acoustic sensor, or an electrical sensor. The cartridge 200 includes a bracket 210 for supporting a retainer 220. The retainer 220 is formed of a porous or permeable material and may, for example, be formed from a braided or beaded material having a plurality of pores therein that is capable of withstanding corrosion and erosion from the fluid, such as metal or glass. The pores are sized to allow a fluid 155 to flow therethrough and into a substrate 230 encapsulated by the retainer 220. The pores are further limited in size to prevent the substrate 230 from being ejected from the retainer 220. The pores of the retainer 220 are thus capable of retaining the substrate 230 within an area bounded by the retainer 220.

The substrate 230 is formed of a polymer matrix that is embedded with an ion-indicator. In one example, the ion-indicator may be covalently bonded to the polymer matrix. The polymer matrix may be made of hydrogel, silicon, PVA or PVC and may be formed of a plurality of spheres or fibers to thereby increase a surface area exposed to the fluid 155 to enable increased accuracy in measuring ion concentration of the fluid 155. In one aspect, the ion-selective substrate 230 is hydrophilic and oleophobic, that is, the ion-selective substrate 230 is configured to absorb water but repel oil as discussed below with reference to FIG. 4. The ion-selective substrate 230 is thus configured to interact with the fluid 155 and through the use of the ion indicator, to modify an optical characteristic of the substrate 230 according to an ion concentration of the fluid 155. For example, in its initial state the ion-selective substrate 230 is clear or transparent with no color. As the ion concentrations of the fluid 155 change, the ion indicator causes the polymer matrix to change color. The change in color is indicative of the ion concentration of the fluid 155. As such, the ion-selective substrate 230 is configured to be optically affected by changes in the ion concentration of the fluid 155 through the use of the ion indicator.

Cartridge 200 thus allows fluid 155 to interact with ion-selective substrate 230 to modify an optical characteristic the of ion-selective substrate 230 according to an ion concentration in the fluid 155. The optical path of sensor 154 is defined by an illumination light 171 generated by an optical source 170. In some embodiments, optical source 170 may be a broadband lamp, a laser, a light-emitting diode, or any other source of electromagnetic radiation. Illumination light passes through a window 160 that is disposed on a first side of the cartridge 200. The cartridge 200 helps facilitate optical interaction of illumination light 171 with ion-selective substrate 230 by disposing the substrate 230 in the optical path of the sensor 154. The retainer 220 maintains the position of the substrate 230 within the optical path of the sensor 154 thus enabling the generation of sample light 172. More specifically, the cartridge 200 provides a location for the optical interaction between illumination light 171 and ion-selective substrate 230 to take place thereby enabling the generation of sample light 172. In some embodiments, sample light 172 may include fluorescence emitted photons or Raman shifted photons from the fluid 155.

Sample light 172 passes through a window 160 located on a second side of the cartridge 200, opposite the first side. Sample light 172 is indicative of the ion concentration of the fluid 155. In some embodiments, a property of the sample light 172 that is indicative of the ion concentration in fluid 155 may be an intensity, a polarization state, a phase, a wavelength (e.g., via Raman scattering or fluorescence), or any combination of the above. For example, the intensity of the emitted fluorescent light or the intensity of the Raman light may be proportional to the ion concentration in the fluid 155. Moreover, a wavelength shift in the fluorescence emission or in the Raman emission may be indicative of the ion concentration in the fluid 155.

Sensor 155 also includes a detector 180 that receives the sample light 172 and provides an electrical signal to a controller 190. In some embodiments, the electrical signal is proportional to the property of the sample light 172. In some embodiments, an optical filter (not shown) may be used in front of detector 180 to select the range of wavelengths of the sample light 172 needed for the measurement (e.g., Raman spectrum) while removing other wavelengths (e.g., original excitation laser wavelength). The controller 190 has a processor 191 and a memory 192. Memory 192 stores data and commands which, when executed by processor 191, cause controller 190 to direct system 150 to perform steps in methods consistent with the present disclosure.

FIG. 3 is an exploded view of a polymer matrix packaged in a cartridge 200, in accordance with some examples. The cartridge 200 includes the bracket 210, retainer 220, and substrate 230. The bracket 210 is formed of a rigid material, such as metal, and includes openings 211 along its periphery to allow fluid to enter unimpeded therethrough. The bracket 210 includes a first opening 213 formed by cross members 212. The retainer 220 is disposed within the first opening 213 of the bracket 210. The retainer 220 may have a circular or ring shape and has a second opening 221 surrounded by walls of the retainer 220. The walls of the retainer 220 are permeable and have pores that enable fluid to flow therethrough, as discussed above. The substrate 230 is disposed within the second opening 221 of the retainer 220. As also discussed above, the substrate 230 is a polymer matrix embedded with an ion-indicator that is configured to modify an optical characteristic of the substrate 230 according to an ion concentration of fluid coming into contact with the substrate 230. Specifically, fluid comes into contact with outer surface 231 of the substrate 230 and is absorbed within the substrate 230 via hydrophilic properties of the substrate 230. End surfaces 232 of the substrate 230 are intended to directly contact windows 160 of the sensor. As such, illumination light passing through window 160 interacts with the substrate 230 at end surface 232 directly facing window 160. In one aspect, the cartridge 200 may include a microfilter (not shown) for housing the substrate 230.

As shown, the cartridge 200 is disposed within an optical path of sensor, in between a first housing 165A containing an optical source and a second housing 165B containing a detector. The sensor has a flow path passing therethrough defined by channel 156. The cartridge 200 is configured to position the substrate 230 in the flow path of fluid passing through channel 156.

FIG. 4 is a cross-section view of a polymer matrix packaged in a cartridge 200, in accordance with some examples. When assembled, the ion-selective substrate 230 is positioned directly in the optical path 171, 172 of the sensor. Fluid 155 entering channel 156 passes through the retainer 220 and into the substrate 230 thereby enabling the substrate to respond to the ion concentration of the fluid 155 via color changes to the ion indicators embedded within the polymer matrix of the substrate 230. A thickness of the bracket 210 that supports the retainer 220 is less than a thickness of the retainer 220 to enable fluid 155 to come into contact with the retainer 220 and to thereby travel through the retainer 220 and into the substrate 230.

As described above, the substrate 230 is positioned to contact the fluid 155 on an outer surface of the substrate 230 and the substrate 230 is positioned to interact with an illumination light 171 on an end surface separate from the outer surface. Due to temperature and pressure conditions downhole, the substrate 230 will expand. Due to the retention capabilities of the retainer 220, the substrate 230 is allowed to expand along the optical path 171, 172 in a direction transverse from the direction of the fluid flow path and transverse to planes defined by the end surfaces of the substrate 230. As a result of the expansion of the substrate along the optical path 171, 172, the end surfaces of the substrate 230 come into direct contact with the windows 160 thereby creating a fluid seal between the substrate 230 and the windows 160. By creating a fluid seal between the ion-sensitive substrate 230 and the windows 160, filtrate and oil are able to flow around the substrate due to its oleophobic properties and not into the optical path of the sensor, thereby increasing the accuracy of ion concentration measurements taken from the substrate 230. As described above, an optical source 170 is configured to provide an illumination light 171 through a first window 160 and to the ion-sensitive substrate 230 where sample light 172 is then generated and passed through to second window 160 and to detector 180 for measurement. As such, measurements are taken along the sensing path, through the substrate 230, downhole and in real time enabling improved monitoring of ion concentrations of the fluid 155.

FIG. 5 is a flowchart of an example method 300 for determining ion concentration of a fluid downhole using a polymer matrix packaged in a cartridge, in accordance with some examples. The steps outlined herein are exemplary and can be implemented in any combination thereof, including combinations that exclude, add, or modify certain steps.

Through the use of an ion-selective substrate that is packaged in a removable cartridge, ion concentration of drilling fluid may be monitored and measured in real time using color-changing ion indicators that are embedded in a polymer matrix. To ensure that the substrate is capable of maintaining a fluidic seal within the optical path of a sensor, the expansion ratio for the substrate must first be determined to ensure that for a given pressure and temperature condition downhole, the substrate performs adequately.

At step 302, an expansion ratio for the substrate is identified based on a series of measurements taken at various temperatures and pressures. At step 304, based on the expansion ratio for the substrate, for a given temperature and pressure condition of the downhole, a volume of the ion-selective substrate is identified to ensure that the substrate expands to create a fluidic seal within the optical path of the sensor.

At step 306, the identified volume of the ion-selective substrate is packed into a cartridge for use downhole. The cartridge is disposed within a fluid flow path of the sensor and within an optical path of the sensor. The cartridge includes a bracket having a first opening and a retainer disposed within the first opening, the retainer formed of a porous material having pores sized to allow a fluid to flow therethrough. The retainer has a second opening for supporting the substrate. The substrate is thus disposed within the second opening and comprises a polymer matrix embedded with an ion-indicator. The substrate is configured to interact with the fluid and to modify an optical characteristic of the substrate according to an ion concentration of the fluid. For example, the substrate is configured to change color according to the ion concentration of the fluid.

At step 308, the substrate is illuminated by an optical source of the sensor. At step 310, a change in an optical characteristic of the substrate is detected. The change is indicative of the ion concentration of the fluid. At step 312, the ion concentration of the fluid is determined in real-time thereby enhancing operational efficiency, reducing risks, and maximizing oil recovery rates in a cost-effective and sustainable manner.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A cartridge to detect ion concentration of a fluid comprising: a bracket having a first opening; a retainer disposed within the first opening, the retainer formed of a porous material having pores sized to allow a fluid to flow therethrough, the retainer having a second opening; and a substrate disposed within the second opening, the substrate comprising a polymer matrix embedded with an ion-indicator, the substrate configured to interact with the fluid and to modify an optical characteristic of the substrate according to an ion concentration of the fluid.

Statement 2: A cartridge according to Statement 1, wherein the substrate is hydrophilic and oleophobic.

Statement 3: A cartridge according to any of Statements 1 and 2, wherein the polymer matrix comprises at least one of a hydrogel, silicon, PVA and PVC.

Statement 4: A cartridge according to any of Statements 1 through 3, wherein the ion-indicator is covalently bonded to the polymer matrix.

Statement 5: A cartridge according to any of Statements 1 through 4, wherein the substrate is configured to change color according to the ion concentration of the fluid.

Statement 6: A cartridge according to any of Statements 1 through 5, wherein the substrate is configured to contact the fluid on a first surface and the substrate interacts with an illumination light on a second surface separate from the first surface.

Statement 7: A cartridge according to any of Statements 1 through 6, wherein the substrate is configured to expand in a direction transverse to the second surface.

Statement 8: A cartridge according to any of Statements 1 through 7, wherein the pores of the retainer are sized to retain the substrate within the second opening.

Statement 9: A cartridge according to any of Statements 1 through 8, wherein the retainer is formed from a braided or beaded material.

Statement 10: A system for measuring ion concentration of a fluid downhole using a polymer matrix packaged in a cartridge comprising: an optical source configured to provide an illumination light through a first window; a cartridge disposed adjacent to the first window, the cartridge comprising: a bracket having a first opening; a retainer disposed within the first opening, the retainer formed of a porous material having pores sized to allow a fluid to flow therethrough, the retainer having a second opening; and a substrate disposed within the second opening, the substrate comprising a polymer matrix embedded with an ion-indicator, the substrate configured to interact with the fluid and to modify an optical characteristic of the substrate according to an ion concentration of the fluid; a detector configured to receive a sample light passing through the substrate and a second window, the second window disposed between the cartridge and the detector, wherein the illumination light optically interacts with the substrate to generate the sample light, the sample light indicative of the ion concentration of the fluid; and a controller configured to measure the ion concentration of the fluid based on the sample light.

Statement 11: A system according to Statement 10, wherein the substrate is hydrophilic and oleophobic.

Statement 12: A system according to any of Statements 10 and 11, wherein the polymer matrix comprises at least one of a hydrogel, silicon, PVA and PVC.

Statement 13: A system according to any of Statements 10 through 12, wherein the substrate is configured to change color according to the ion concentration of the fluid.

Statement 14: A system according to any of Statements 10 through 13, wherein the substrate is configured to contact the fluid on a first surface and the substrate interacts with the illumination light on a second surface separate from the first surface.

Statement 15: A system according to any of Statements 10 through 14, wherein the substrate is configured to expand in a direction transverse to the second surface and along a sensing path to create a fluid seal between the substrate and directly adjacent surfaces.

Statement 16: A system according to any of Statements 10 through 15, wherein the pores of the retainer are sized to retain the substrate within the second opening.

Statement 17: A system according to any of Statements 10 through 16, wherein the detector comprises an optical sensor configured to detect one or more physical properties of the sample light for measuring the ion concentration of the fluid.

Statement 18: A method for determining ion concentration of a fluid downhole using a polymer matrix packaged in a cartridge, the method comprising: disposing a cartridge within an optical path of a sensor, the cartridge comprising: a bracket having a first opening; a retainer disposed within the first opening, the retainer formed of a porous material having pores sized to allow a fluid to flow therethrough, the retainer having a second opening; and a substrate disposed within the second opening, the substrate comprising a polymer matrix embedded with an ion-indicator, the substrate configured to interact with the fluid and to modify an optical characteristic of the substrate according to an ion concentration of the fluid; illuminating the substrate; detecting a change in an optical characteristic of the substrate, the change indicative of the ion concentration of the fluid; and determining the ion concentration of the fluid.

Statement 19: A method according to Statement 18, further comprising identifying a volume of the substrate to be used downhole for expansion prior to disposing the cartridge within the flow path of the sensor, wherein the volume of the substrate is identified based on the temperature and pressure conditions of the downhole.

Statement 20: A method according to any of Statements 18 and 19, wherein the substrate is configured to change color according to the ion concentration of the fluid.

What is claimed is:

1. A cartridge to detect ion concentration of a fluid comprising:
    a bracket having a first opening;
    a retainer disposed within the first opening, the retainer formed of a porous material having pores sized to allow a fluid to flow therethrough, the retainer having a second opening; and
    a substrate disposed within the second opening, the substrate comprising a polymer matrix embedded with an ion-indicator, the substrate configured to interact with the fluid and to modify an optical characteristic of the substrate according to an ion concentration of the fluid.

2. The cartridge of claim 1, wherein the substrate is hydrophilic and oleophobic.

3. The cartridge of claim 1, wherein the polymer matrix comprises at least one of a hydrogel, silicon, PVA and PVC.

4. The cartridge of claim 1, wherein the ion-indicator is covalently bonded to the polymer matrix.

5. The cartridge of claim 1, wherein the substrate is configured to change color according to the ion concentration of the fluid.

6. The cartridge of claim 1, wherein the substrate is configured to contact the fluid on a first surface and the substrate interacts with an illumination light on a second surface separate from the first surface.

7. The cartridge of claim 6, wherein the substrate is configured to expand in a direction transverse to the second surface.

8. The cartridge of claim 1, wherein the pores of the retainer are sized to retain the substrate within the second opening.

9. The cartridge of claim 1, wherein the retainer is formed from a braided or beaded material.

10. A system for measuring ion concentration of a fluid downhole using a polymer matrix packaged in a cartridge comprising:
    an optical source configured to provide an illumination light through a first window;
    a cartridge disposed adjacent to the first window, the cartridge comprising:
        a bracket having a first opening;
        a retainer disposed within the first opening, the retainer formed of a porous material having pores sized to allow a fluid to flow therethrough, the retainer having a second opening; and
        a substrate disposed within the second opening, the substrate comprising a polymer matrix embedded with an ion-indicator, the substrate configured to interact with the fluid and to modify an optical characteristic of the substrate according to an ion concentration of the fluid;
    a detector configured to receive a sample light passing through the substrate and a second window, the second window disposed between the cartridge and the detector, wherein the illumination light optically interacts with the substrate to generate the sample light, the sample light indicative of the ion concentration of the fluid; and
    a controller configured to measure the ion concentration of the fluid based on the sample light.

11. The system of claim 10, wherein the substrate is hydrophilic and oleophobic.

12. The system of claim 10, wherein the polymer matrix comprises at least one of a hydrogel, silicon, PVA and PVC.

13. The system of claim 10, wherein the substrate is configured to change color according to the ion concentration of the fluid.

14. The system of claim 10, wherein the substrate is configured to contact the fluid on a first surface and the substrate interacts with the illumination light on a second surface separate from the first surface.

15. The system of claim 14, wherein the substrate is configured to expand in a direction transverse to the second surface and along a sensing path to create a fluid seal between the substrate and directly adjacent surfaces.

16. The system of claim 10, wherein the pores of the retainer are sized to retain the substrate within the second opening.

17. The system of claim 10, wherein the detector comprises an optical sensor configured to detect one or more physical properties of the sample light for measuring the ion concentration of the fluid.

18. A method for determining ion concentration of a fluid downhole using a polymer matrix packaged in a cartridge, the method comprising:
- disposing a cartridge within an optical path of a sensor, the cartridge comprising:
  - a bracket having a first opening;
  - a retainer disposed within the first opening, the retainer formed of a porous material having pores sized to allow a fluid to flow therethrough, the retainer having a second opening; and
  - a substrate disposed within the second opening, the substrate comprising a polymer matrix embedded with an ion-indicator, the substrate configured to interact with the fluid and to modify an optical characteristic of the substrate according to an ion concentration of the fluid;
- illuminating the substrate;
- detecting a change in an optical characteristic of the substrate, the change indicative of the ion concentration of the fluid; and
- determining the ion concentration of the fluid.

19. The method of claim 18, further comprising identifying a volume of the substrate to be used downhole for expansion prior to disposing the cartridge within the flow path of the sensor, wherein the volume of the substrate is identified based on the temperature and pressure conditions of the downhole.

20. The method of claim 18, wherein the substrate is configured to change color according to the ion concentration of the fluid.

* * * * *